United States Patent [19]
Wynn

[11] Patent Number: 5,952,914
[45] Date of Patent: Sep. 14, 1999

[54] POWER LINE COMMUNICATION SYSTEMS

[75] Inventor: Woodson Dale Wynn, Basking Ridge, N.J.

[73] Assignee: AT&T Corp., Middletown, N.J.

[21] Appl. No.: 08/926,609

[22] Filed: Sep. 10, 1997

[51] Int. Cl.[6] .................................................. H04M 11/04
[52] U.S. Cl. ............................... 340/310.01; 340/310.03; 340/310.06; 340/310.07
[58] Field of Search ..................... 340/310.01, 310.02, 340/310.03, 310.05, 310.06, 310.07, 310.2; 375/259; 455/3.3

[56] References Cited

U.S. PATENT DOCUMENTS

| | | | |
|---|---|---|---|
| 3,942,168 | 3/1976 | Whyte | 340/310.01 |
| 4,060,735 | 11/1977 | Pascucci et al. | 307/3 |
| 4,142,178 | 2/1979 | Whyte et al. | 340/310.06 |
| 4,311,964 | 1/1982 | Boykin | 329/104 |
| 4,475,193 | 10/1984 | Brown | 340/310.01 |
| 4,479,215 | 10/1984 | Baker | 371/33 |
| 4,510,611 | 4/1985 | Dougherty | 375/8 |
| 4,514,594 | 4/1985 | Brown et al. | 340/310.01 |
| 4,633,218 | 12/1986 | Palsgrove et al. | 340/310.02 |
| 5,066,939 | 11/1991 | Mansfield, Jr. | 340/310.02 |
| 5,257,006 | 10/1993 | Graham et al. | 340/310 |
| 5,391,932 | 2/1995 | Small et al. | 307/125 |
| 5,404,127 | 4/1995 | Lee et al. | 340/310.02 |
| 5,491,463 | 2/1996 | Sargeant et al. | 340/310.01 |
| 5,581,229 | 12/1996 | Hunt | 340/310.02 |
| 5,684,450 | 11/1997 | Brown | 340/310.02 |
| 5,691,691 | 11/1997 | Merwin et al. | 340/310.02 |
| 5,694,108 | 12/1997 | Shuey | 340/310.01 |

OTHER PUBLICATIONS

"Power–Line Carrier Systems", Authors:T.M. Swingle & H.I. Dobson, Chapter 14, pp. 14–19.

"A Model For Communication Signal Propagation On Three Phase Power Distribution Lines", Authors: M.E. Hardy, S. Ardlan, J.B. O'Neal, Jr., L.J. Gale & K.C. Shuey, IEEE Transactions on Power Delivery, vol. 6, No. 3, Jul. 1991, pp. 966–972.

"Decoupling Networks For Promoting Power Line Carrier Systems"; Author: K.S. Murthy; IEEE Transactions on Power Delivery, vol. 10, No. 2, Apr. 1995, pp. 580–587.

"Power–Line Noise Survey", Author: A. A. Smith, Jr., IEEE Transactions On Electromagnetic Compatibility, vol. T–EMC, Feb. 1972, pp. 31–32.

"Transmission Lines and Waveguides"; Author: R.V. Lowman, of book; Chapter 42, pp. 42–1–42–6.

"Coupled Transmission Line Networks in a Inhomogeneous Dielectric Medium"; Authors: G.I. Zysman & A.K. Johnson, IEEE Transactions on Microwave Theory and Techniques, vol. MTT–17, No. 10, Oct. 1969, pp. 753–759.

"IEEE Guide for Power–Line Carrier Applications", Institute of Electrical and Electronics Engineers, NY, NY, Committee of IEEE Power Eng. Society; Sponsor: Power System Communications, IEEE Standard 643–1980, Jan. 30, 1981, ANSI, pp. 2–63.

*Primary Examiner*—Jeffery Hofsass
*Assistant Examiner*—Toan N. Pham

[57] ABSTRACT

Two duplex channels are provided using only three lines, two power lines and one neutral line. The transmitter/receiver of each duplex channel includes adaptive filters to cancel cross-coupling introduced by the common neutral line. Each channel is coupled to a power line using a hybrid line driver/receiver device. The hybrid line driver/receiver device includes an echo canceller and a bridge circuit to allow transmitting and receiving signals to and from a single power line with minimized echoing effects. The signal-to-noise ratios of each duplex channel is significantly increased so that two duplex channels may be implemented using only three wire connections. Thus, the communication capacity of power line communication systems is greatly increased compared to that for a single 2-wire channel.

26 Claims, 9 Drawing Sheets

POWER LINE COMMUNICATION SYSTEMS

BACKGROUND OF THE INVENTION

1. Field of Invention

This invention relates to power line communication systems that transmit and receive signals via power lines.

2. Description of Related Art

Power lines are commonly connected to residential units using two power lines and one ground line. Communication signals may be transmitted using these power lines without requiring additional cabling. The number of physical channels has been limited by the number of wires, each of the physical channels requiring at least two wires. Previously, only one channel has been defined using the three wires. There is a need to increase the number of channels without requiring additional cabling.

SUMMARY OF THE INVENTION

This invention provides two duplex channels using only two power lines and one neutral line. The transmitter/receiver of each duplex channel includes adaptive filters to cancel cross-coupling between the channels introduced by using the same neutral line for each of the duplex channels. Additionally, the channels are equalized by adaptive filters to compensate for channel distortions.

Each of the duplex channels is coupled to its respective power-neutral line pair using a hybrid line driver/receiver device. The hybrid line driver/receiver device includes an echo canceller and a bridge circuit to allow transmitting and receiving signals to/from a single power-neutral line pair over the same frequency bands. The hybrid line driver/receiver device also includes a line driver and a line receiver. The echo canceller cancels transmitted signals that are coupled to the line receiver due to imperfections of the bridge circuit and the line driver.

The adaptive filters and the hybrid line driver/receiver device increases signal-to-noise ratios of each duplex channel providing two duplex channels over three power lines. Thus, the communication bandwidth of power line communication systems is greatly increased over that previously obtained with power line carrier communication devices.

BRIEF DESCRIPTION OF THE DRAWINGS

The invention is described in relation to the following drawings wherein like numerals represent like elements, and wherein.

DETAILED DESCRIPTION OF PREFERRED EMBODIMENTS

Figure 1:
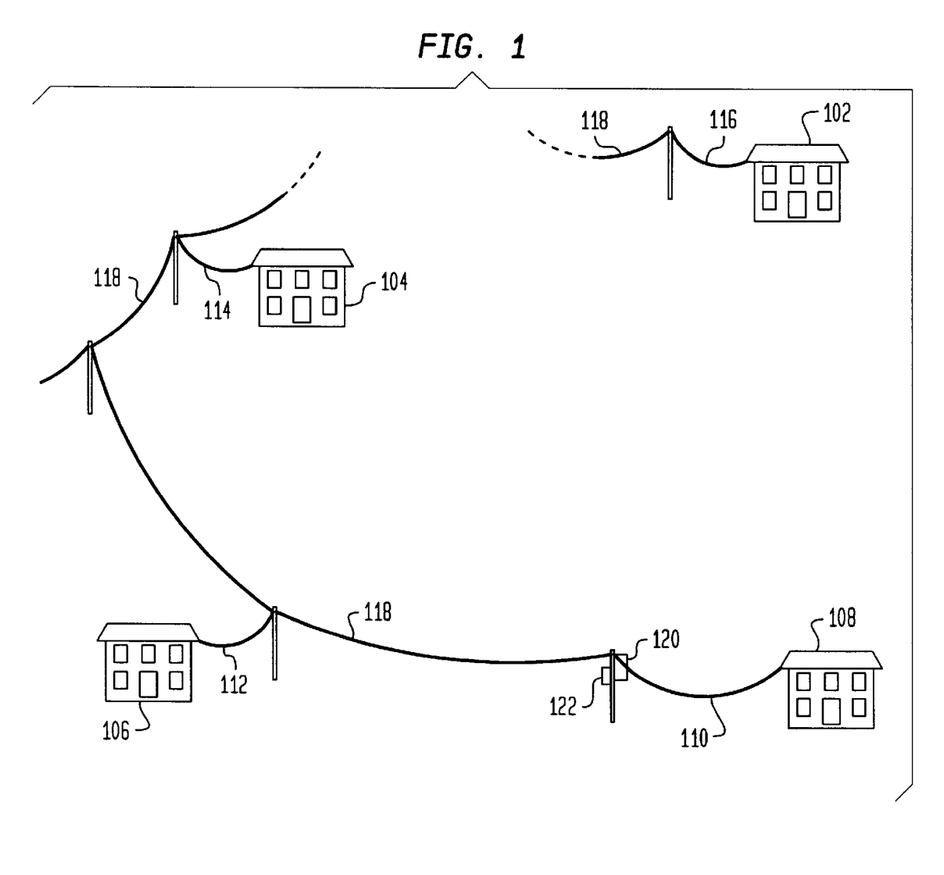
FIG. 1 is a diagram of a power line system connecting residential units.

FIG. 1 shows power line 118 connected to individual residential units 102, 104, 106 and 108. The power line is connected to a transformer 120 which converts power from high voltage lines to power to be supplied to the residential units 102, 104, 106 and 108. Each of the residential units 102, 104, 106 and 108 are individually connected to the power line 118 through connection lines 116, 114, 112 and 110, respectively. A central transmitter/receiver 122 is coupled to the power line near the transformer 120.

Figure 2:
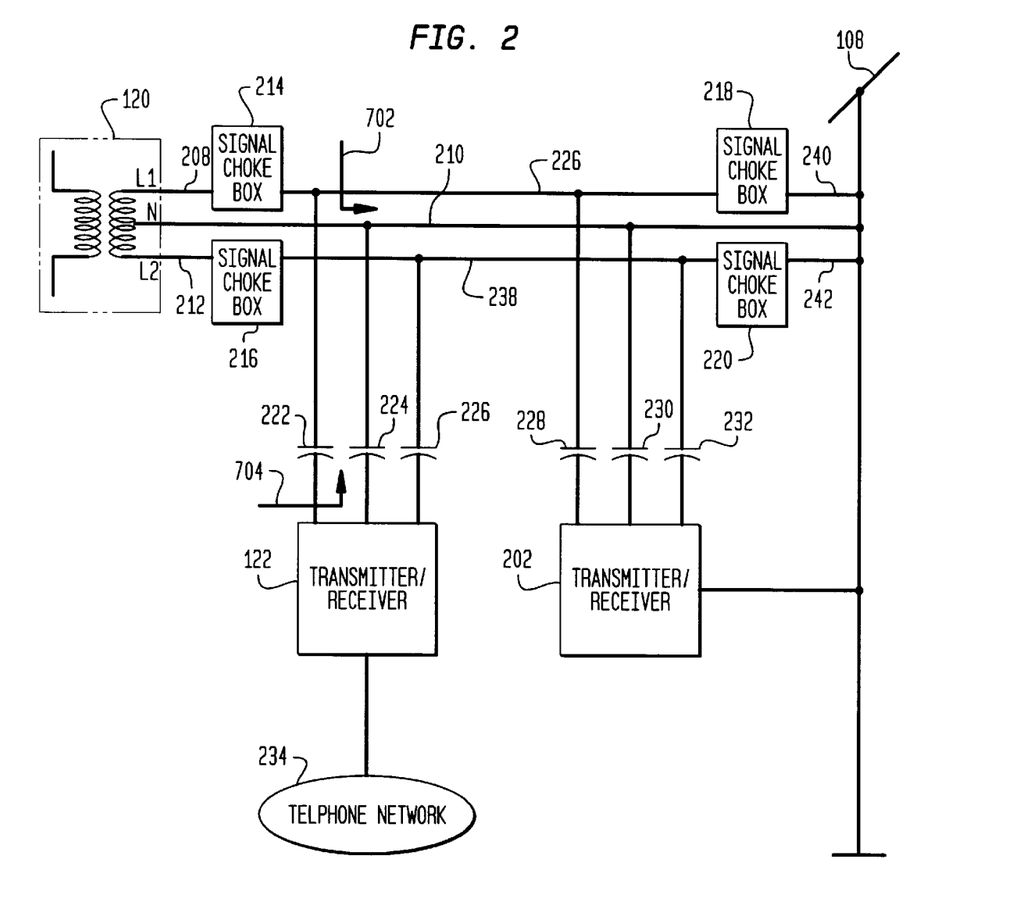
FIG. 2 is a schematic diagram a communication system using power line connections between a residence and a transformer as a transmission medium.

FIG. 2 shows a schematic diagram of the connection of transformer 120 to the house 108. The secondary side of the transformer 120 includes three lines 208, 210 and 212. The lines 208 and 212 are power lines and the line 210 is a neutral line. For a conventional power line connection, the voltage between each of the power lines 208 and 212 and the neutral line 210 is at about 110 volts AC. However, the phase difference between the power lines 208 and 212 are about 180 degrees apart so that the voltage between the power lines 208 and 212 is about 220 volts AC.

Signal choke blocks 214 and 216 are connected in series with the power lines 208 and 212, respectively at the transformer. The lines 210, 236 and 238 form a power line drop from the transformer 120 to the residential unit 108. The signal choke blocks 218 and 220 are connected in series to the power lines 236 and 238, respectively, at the residential unit end of the power line drop. The signal choke blocks 218 and 220 are also connected to power lines 240 and 242 that supply power to the residential unit 108. The signal choke blocks 214, 216, 218, and 220 are intended to isolate RF signals on the power line drop from impedance variations and noises from the transformer and the residential unit 108.

The transmitter/receiver 122 and a transmitter/receiver 202 are coupled to the power lines 236 and 238 via coupling capacitors 222–232. The transmitter/receiver 122 is also coupled to a communication network such as telephone network 234. The transmitter/receiver 202 is coupled to terminal(s) located within the residential unit 108. Thus, communication between the terminal(s) within the residential unit 108 and other terminal(s) coupled to the telephone network 234 may be accomplished.

The signal choke blocks 214 and 216 decouple noise signals on the lines 208, 210 and 212 from the power lines 236 and 238. The signal choke block 218 and 220 decouple noise signals on the lines 240, 242 and 210 from the power lines 236 and 238. Thus, noise occurring in the communication bands generated by home appliances in the residential units 102, 104, 106 and 108 are blocked from interfering with the communication between transmitter/receivers 122 and 202.

The transmitter/receivers 122 and 202 provide two duplex channels transmitting and receiving signals through the two power lines 236 and 238 and the neutral line 210. A first duplex channel transmits and receives signals in the same bands through the power line 236 and the neutral line 210 while a second duplex channel transmits and receives information in the same bands using the power line 238 and the neutral line 210. Thus, the neutral line 210 is shared between the first and the second duplex channels and the same frequency bands are used on both power-neutral line pairs 236 and 210, 238 and 210 for both transmit and receive signals. Because the neutral line 210 is shared, signals in the first duplex channel may be cross-coupled to the second duplex channel and vice versa. This cross-coupling reduces the signal-to-noise ratio so that transmission using two duplex channels is difficult without compensation. Thus, the cross-coupling through the neutral line 210 must be canceled before the two duplex channels can operate independently.

The transmitter/receivers 122 and 202 cancel the cross-coupling between the first and second duplex channels as well as performing equalization of the transmission channels by using adaptive filters. Thus the transmitter/receivers 122 and 202 are able to provide two duplex channel communication between the residential unit 108 and the telephone network 234 over the same frequency bands. The adaptive filters are described in detail below.

Figure 3:
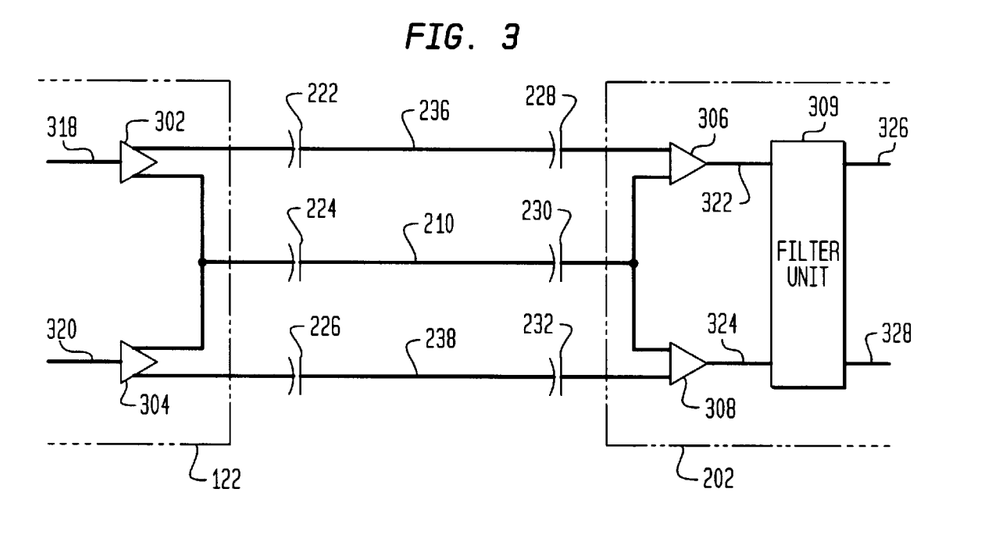
FIGS. 3 and 4 are schematic diagrams of transmitters/receivers in two directions using the same set of power lines.
Figure 4:
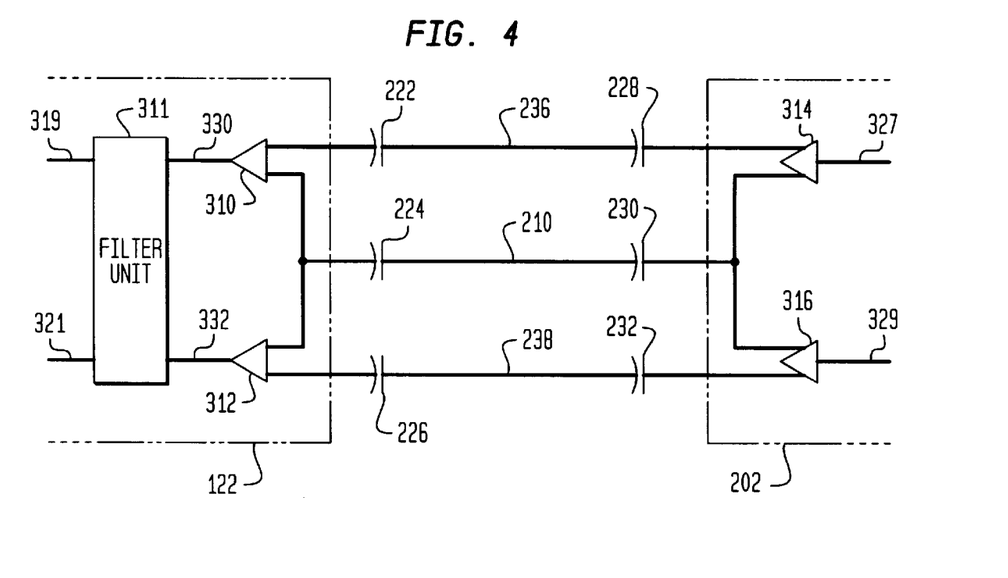

FIGS. 3 and 4 show a schematic diagram of the connection between line drivers and line receivers of the transmitter/receivers 122 and 202. The transmitter/receiver 122 includes differential line drivers 302 and 304 corresponding to the first and the second duplex channels forward inputs. The line driver 302 receives an input signal from signal line 318 and the line driver 304 receives an input signal from input signal line 320. The line driver 302 outputs a differential signal between the power line 236 and the neutral line 210 through the coupling capacitors 222 and 224. The line driver 304 outputs a differential signal to the power line 238 and the neutral line 210 through coupling capacitors 226 and 224, respectively.

Line receivers 306 and 308 of the transmitter/receiver 202 receives the signals transmitted by the transmitter/receiver 122 through the power lines 236 and 238 and the neutral line 210. The output of the line receivers 306 and 308 are connected to an adaptive filter unit 309 through signal lines 322 and 324. The adaptive filtering unit 309 performs line equalization and cross-coupling cancellation to improve the signal-to-noise ratios of the signals output to the signal lines 326 and 328 corresponding to the first and the second duplex channels forward outputs.

FIG. 4 shows a similar diagram as FIG. 3 but with the signals flowing in the opposite direction. Reverse inputs on 327 and 329 connected to line drivers 314 and 316 of the transmitter/receiver 202 transmit signals onto the power lines 236 and 238 and the neutral line 210. Line receivers 310 and 312 of the transmitter/receiver 122 receive the transmitted signals and output the received signals onto signal lines 330 and 332 to be input into adaptive filter unit 311. The adaptive filter unit 311 performs line equalization and cross-coupling cancellation to output received signals onto signal lines 319 and 321 corresponding to the first and the second duplex channel reverse outputs.

Figure 5:
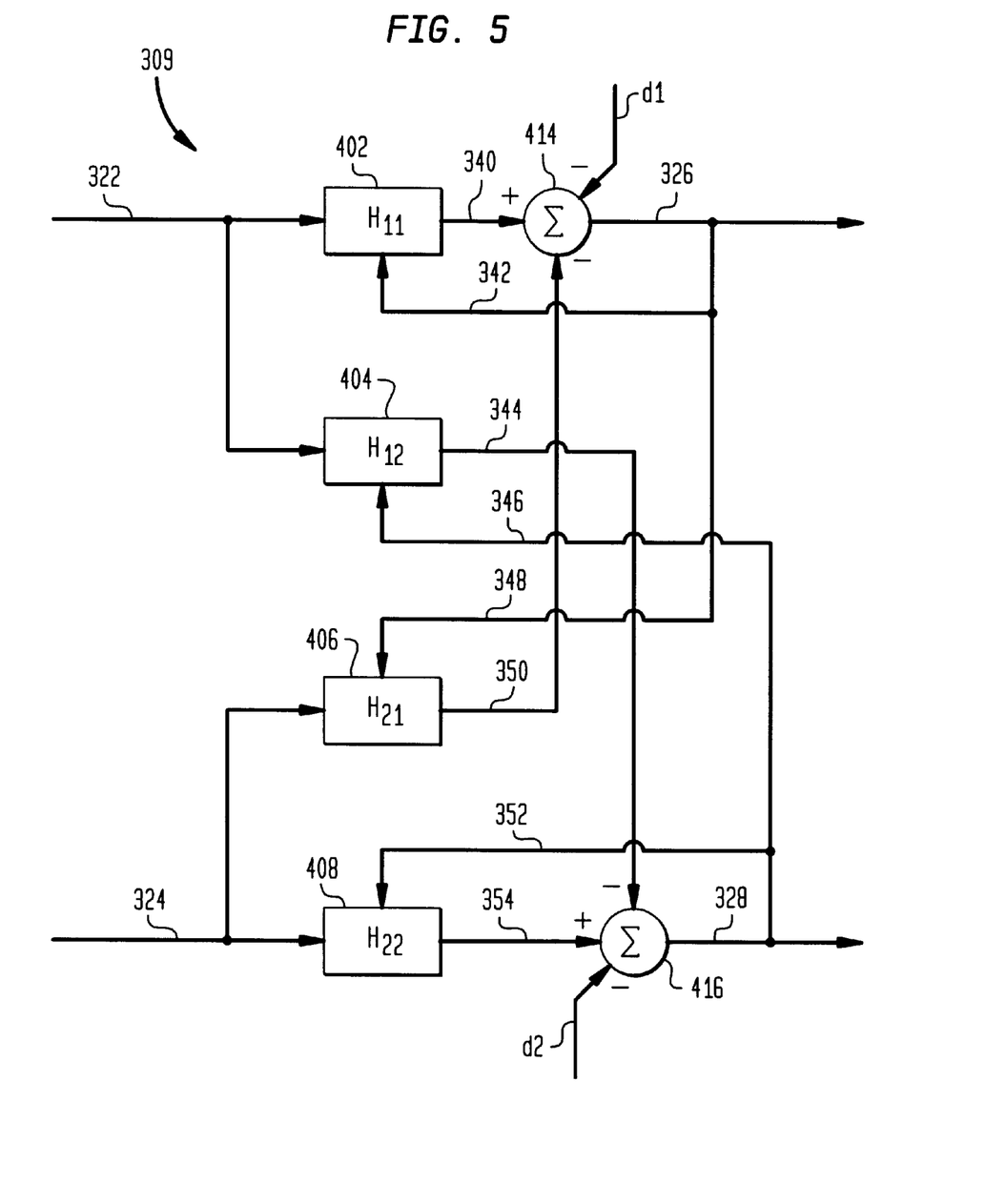
FIG. 5 is a schematic diagram of a first adaptive equalizer configuration used in the transmitter/receivers shown in FIGS. 3 and 4.

FIG. 5 shows a block diagram of an adaptive filter unit such as the adaptive filter unit 309. The adaptive filter unit 309 includes four adaptive filters $H_{11}$ 402, $H_{12}$ 404, $H_{21}$ 406 and $H_{22}$ 408. The adaptive filter $H_{11}$ 402 receives an input signal from the signal line 322 and outputs a filtered signal to a positive input of a summer 414 through signal line 340. The adaptive filter $H_{21}$ 406 receives an input signal from signal line 324 and outputs a filtered signal to a negative input of the summer 414 through signal line 350. Thus, the summer 414 subtracts the output of the adaptive filter $H_{21}$ 406 from the output of the adaptive filter $H_{11}$ 402 to generate an output signal on the signal line 326. The adaptive filters $H_{11}$ 402 and $H_{21}$ 406 receive the output of the summer 414 as a feedback error signal through signal lines 342 and 348, respectively.

In addition, data reference signals $d_1$ are input to a negative terminal of the summer 414. The data reference signals $d_1$ are required for $H_{11}$ 402 to converge and may be data training sequence signals and/or decision feedbacks from final channel data decision outputs of a downstream receiver (not shown), for example.

The adaptive filter $H_{22}$ 408 receives an input signal from the signal line 324 and outputs a filtered signal to a positive input of a summer 416 through signal line 354. The adaptive filter $H_{12}$ 404 receives an input signal from the signal line 322 and outputs a filtered signal to a negative input of summer 416 through signal line 344. Thus, the summer 416 subtracts the output from the adaptive filter $H_{12}$ 404 from the output of the adaptive filter $H_{22}$ 408 to generate an output signal on the signal line 328. The adaptive filters $H_{22}$ 408 and $H_{12}$ 404 receive the output of the summer 416 as a feedback error signal through signal lines 352 and 346, respectively. Similar to summer 414, data reference signals $d_2$ are input to a negative terminal of the summer 416 and are required for $H_{22}$ 408 to converge.

The adaptive filters $H_{11}$ 402 and $H_{22}$ 408 provide line equalization of the input signals received from the signal lines 322 and 324, respectively. The adaptive filters $H_{12}$ 404 and $H_{21}$ 406 adaptively cancel cross-coupling of the input signals between the signal lines 322 and 324 and the neutral line 210.

Figure 6:
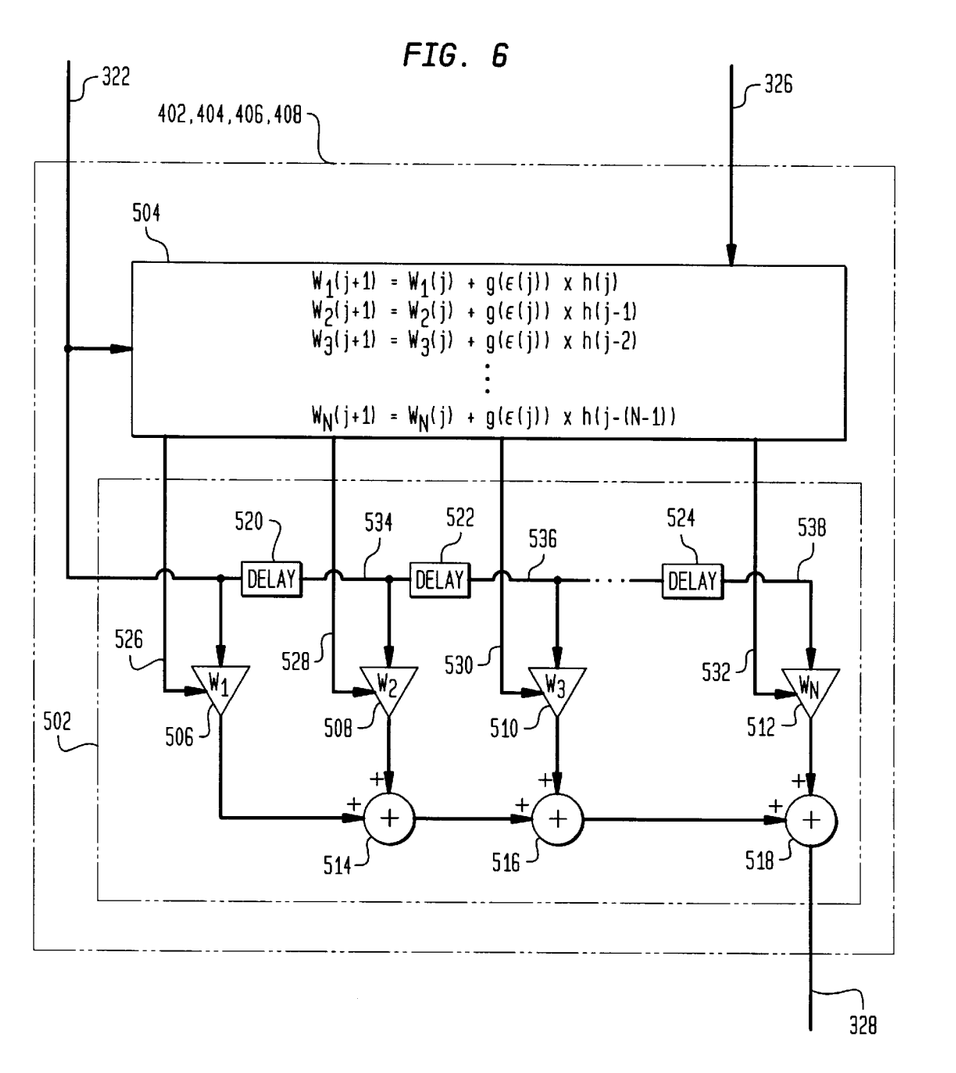
FIG. 6 is a schematic diagram of a typical least-mean-square adaptive equalizer.

FIG. 6 shows an exemplary embodiment of a linear adaptive filter such as the adaptive filters $H_{11}$ 402, $H_{12}$ 404, $H_{21}$ 406 and $H_{22}$ 408 in greater detail. While different adaptive filters may be used such as linear and decision feedback equalizers, FIG. 6 shows a finite-impulse-response (FIR) least-mean-square-error (MMSE) adaptive filter as an example. The filter portion 502 receives the input signal from signal line 322 and delays the input signal by delay units 520, 522 and 524. As indicated by the dotted portion of signal line 536, any number of delay units 520, 522 and 524 may be used depending on particular design requirements of the least-mean-square adaptive filter. If the adaptive filter is a digital adaptive filter the delay units 520, 522 and 524 delay the input signal by some integer fraction of one symbol sub-unit time Ts/K. Thus, the delay unit is Ts/K for some integer K=1,2,3 . . . depending on implementation requirements. This is a fractionally spaced equalizer.

The delay units 520, 522 and 524, multiplier units 506, 508, 510 and 512 and adder units 514, 516 and 518 together form a filter that filters the input signal on signal line 322 and outputs the filtered input signal through signal line 328. The filter characteristics are determined by the weights $W_1$, $W_2$, $W_3$. . . . $W_M$, where M is the length of the filter. Depending on the particular values of the weights, the frequency characteristic of the filter will be determined.

The weights $W_1$, $W_2$, . . . $W_M$ are adaptive weights. The adaptive weights are updated and the updated weights are used by the multipliers 506, 508, 510 and 512 as indicated by the lines connecting a weight update unit 504 and the multipliers 506, 508, 510 and 512.

The weight update unit 504 calculates new weights based on the current set of weights adjusted by a factor which is a product of a constant g multiplied by the error signal $\epsilon(j)$ multiplied by the input signal h(j), where j is the current time. The constant g is selected so that the weight update algorithm converges to generate an optimum set of weights $W_1$, $W_2$. . . $W_M$ that results in the best signal-to-noise ratio within the constraint of adaptivity to changing system conditions. The error signal $\epsilon(j)$ is the output of the summer 414 to adapt $H_{11}$ 402 shown in FIG. 5, for example. The input signal h(j) is delayed corresponding to the total number of delays applied to the input signal by delay units 520, 522 and 524. Thus, the input signal used to update $W_1$ is an undelayed input signal h(j). $W_2$ is updated by using the input signal delayed by the delay unit 520, and so on. The weight update unit 504 generates weights adaptively to minimize, in the mean-square-error sense, the difference between the output of $H_{11}$ 402 and the desired reference $d_1$. A similar adaptive filter is used for $H_{21}$ 406, and this is also adjusted by the error output of summer 414 to minimize the cross-coupled component in the final output 326.

Figure 7:
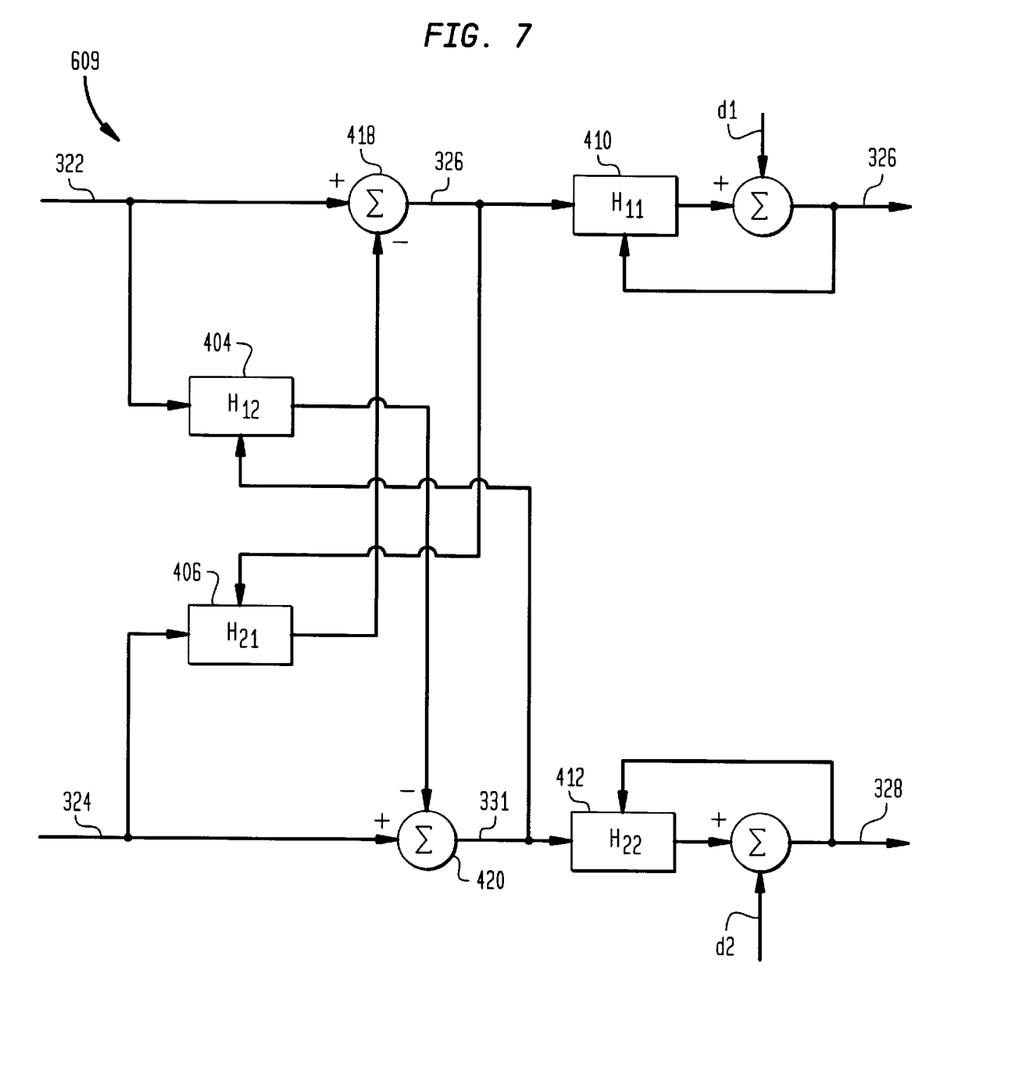
FIG. 7 is a diagram of a second adaptive equalizer configuration.

FIG. 7 shows an adaptive filter unit 609 that is an alternative embodiment to the adaptive filter unit 309. The adaptive filter unit 609 includes the adaptive filters $H_{11}$410, $H_{12}$ 404, $H_{21}$ 406 and $H_{22}$ 412. The adaptive filter unit 609 also includes two summers 418 and 420 for cross terms and two summers 422 and 424 for referencing to desired data $d_1$ and $d_2$. The adaptive filter $H_{11}$ 410 is connected to the output of the summer 418 instead of between the signal line 322 and the summer 418 as in the adaptive filter unit 309. Similarly, the adaptive filter $H_{22}$ 412 is connected to the output of the summer 420. Thus, the adaptive filter unit 609 performs line equalization after canceling the cross-coupling between the signal lines 322 and 324. There may be practical performance advantages to using the two-stage method of FIG. 7.

Figure 8:
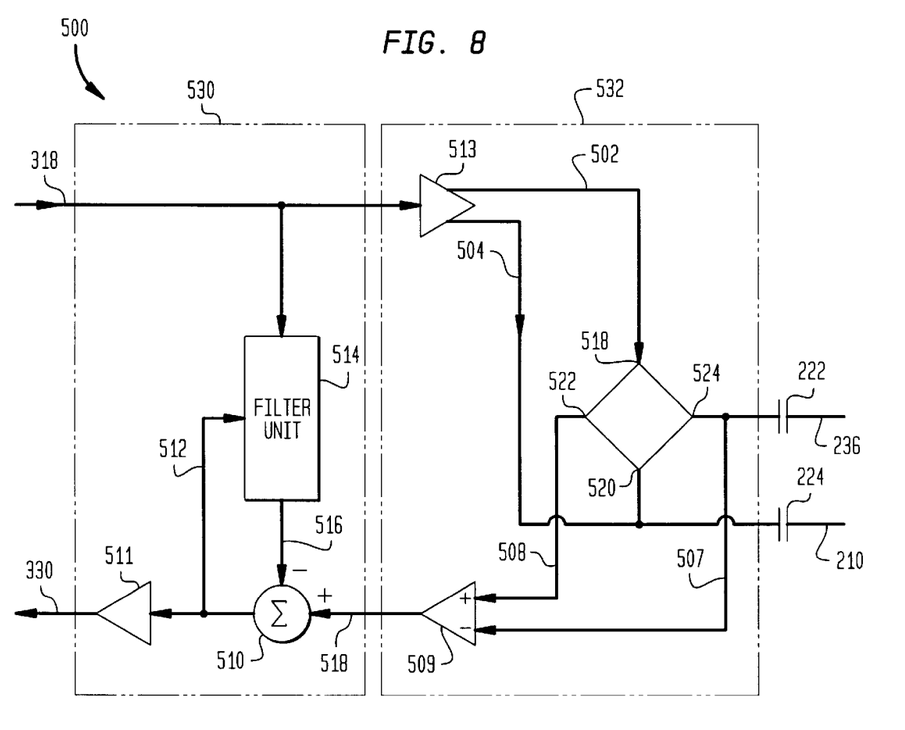
FIG. 8 is a schematic diagram of a combination of echo canceller and a hybrid line driver/receiver device for transmitting and receiving data.

FIG. 8 shows a hybrid line driver/receiver device 500 that includes an echo cancellation device 530 between signal lines 318 and 330 and a transmitter/receiver hybrid 532. The hybrid line driver/receiver device 500 performs a similar function as the line driver 302 and the line receiver 310 shown in FIG. 4. The transmitter/receiver hybrid 532 includes a differential line driver 513, a differential line receiver 509, and a balanced bridge 506. The echo cancellation device 530 includes an adaptive filter 514, a summer 510 and a buffer 511. The differential line driver 513 drives the balanced bridge circuit 506 at top and bottom nodes 518 and 520, respectively. The differential line receiver 509 receives signals from right and left bridge nodes 524 and 522. The output of the differential line receiver 509 is input to a positive input of the summer 510 through signal line 518. The adaptive filter 514 receives an input signal from signal line 318 and outputs a filtered signal to a negative input of the summer 510 through signal line 516. The summer 510 subtracts the filtered signal from the output of the differential line receiver 509 and outputs the result to the buffer 511 which generates an output to signal line 330. The adaptive filter receives the output of the summer 510 through signal line 512 as a feedback error signal.

The adaptive filter 514 may be implemented using techniques such as linear and decision feedback equalizers and echo cancellers that are well known to one of ordinary skill in the art. For example, the finite-impulse-response (FIR) least-mean square-error (MMSE) adaptive filter as shown in FIG. 6 may be used. The function of the adaptive filter 514 is to remove a signal correlated with the signal on line 318 that has been coupled to the signal line 518 via the differential line driver 513 and any imbalance in the balanced bridge circuit 506. The adaptive filter 514 adaptively adjusts weights so that the echo cancellation may account for variations in specific conditions encountered during operation.

Figure 9:
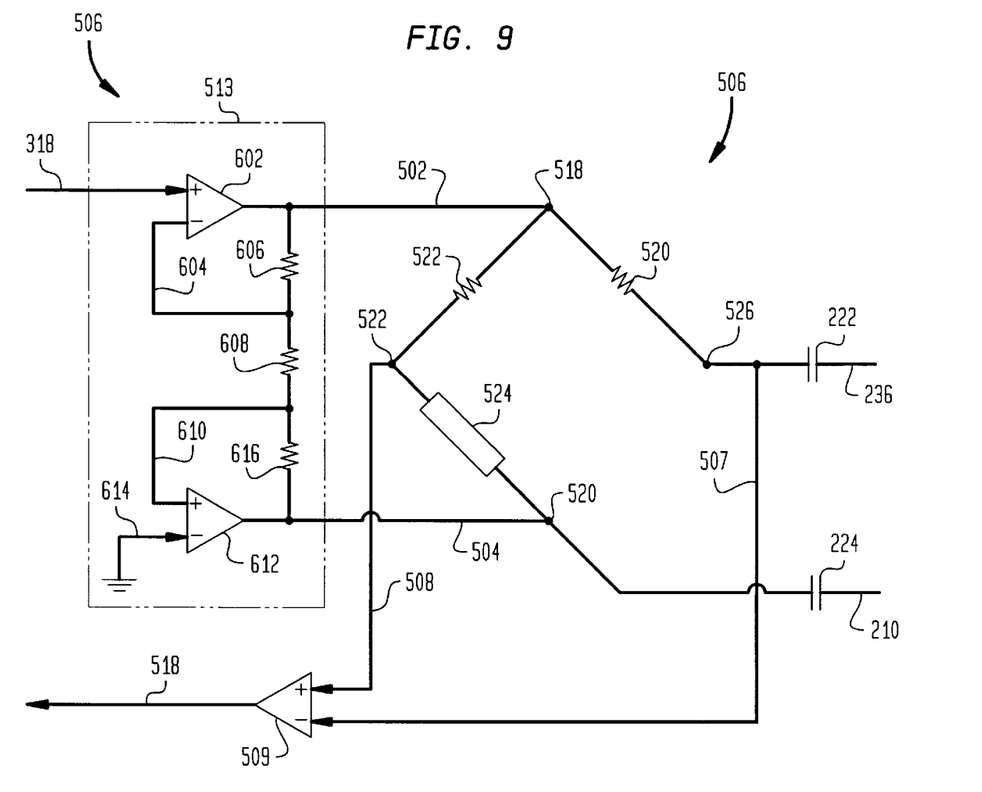
FIG. 9 is a schematic diagram of a hybrid circuit as presented in FIG. 8.

FIG. 9 shows a circuit diagram of the differential line driver 513 and the balanced bridge circuit 506. The differential line driver 513 may include two buffers 602 and 612 connected in voltage follower configurations together with resistors 606, 608 and 616. The positive input terminal of the buffer 612 is connected to a circuit ground reference via signal line 614. Thus, the output of the buffer 612 is maintained at the voltage of the ground reference so that the signal line 504 is at this reference voltage. The positive terminal of the buffer 602 is connected to the signal line 318. Then a signal on the signal line 318 is applied differentially across the bridge nodes 518 and 520 and hence differentially across the power-neutral line pair 236 and 210. Resistors 606, 608 and 616 control the gain of the differential amplifier.

The balanced bridge circuit 506 includes two legs between the nodes 518 and 520. The left leg includes a resistor 522 and an impedance 524. The right leg includes a resistor 520 and an impedance that is the driving point impedance looking into the power-neutral line pair 236 and 210. The resistors 520 and 522 have the same value and the impedance of 524 is assumed to have the same value as the line impedance across the frequency bands of interest for the RF signal transmission.

When a voltage is developed between the nodes 518 and 520, the voltage between nodes 522 and 526 is unaffected when the balanced bridge circuit 506 is balanced. If a signal is received across the power-neutral line pair 236 and 210, the signal will be imaged across nodes 526 and 522. Thus, the voltage difference between the nodes 522 and 526 corresponds only to the signal received across power line 236 to neutral line 210 and does not contain a component of the signal between nodes 518 and 520 that is to be transmitted to the power-neutral line pair 236 and 210.

The voltage between the nodes 522 and 526 is coupled to the differential line receiver 509 through signal lines 508 and 507. Thus, the balanced bridge circuit 506 permits transmitting signals out to the power-neutral line pair 236 and 210 and receiving signals from the power-neutral line pair 236 and 210 in the same bands and at the same time with minimal interference between the transmitted signal and the received signal.

Figure 10:
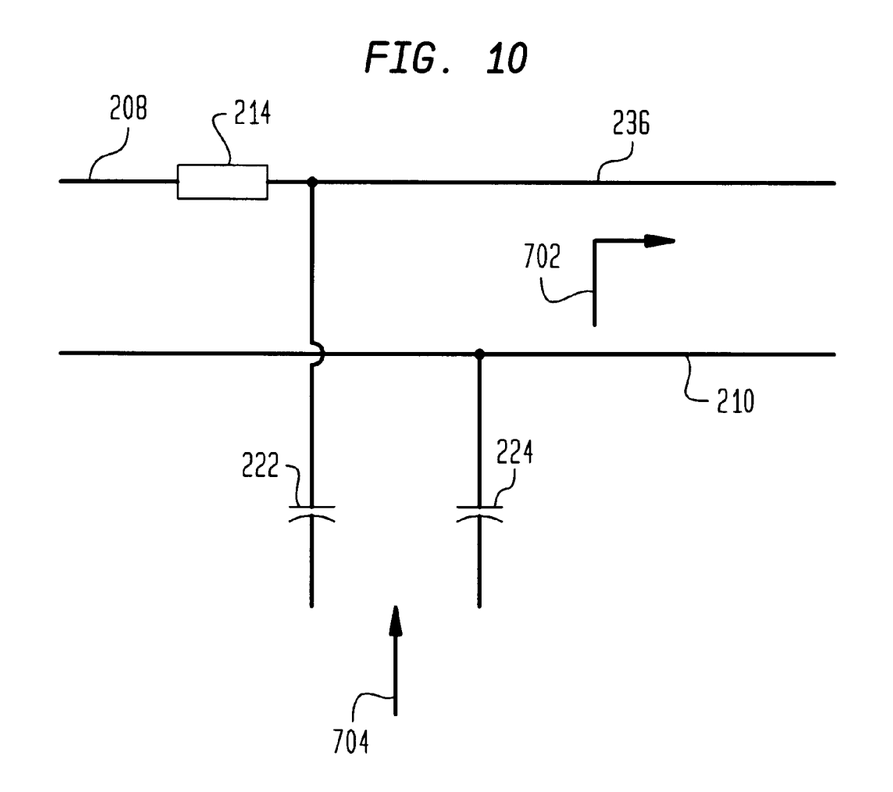
FIG. 10 is a diagram of a power-neutral line pair.

The value of the impedance 524 is determined based on the transmission line impedance seen looking into the power-neutral line pair 236 and 210. FIG. 10 shows impedance values observed from arrows 702 and 704. For the case of an application at the transformer 120 and of the system in FIG. 2, the impedance 524 is set to the value of the impedance as observed from arrow 704 which includes: 1) the impedance of the transmission line as seen from arrow 702; 2) the equivalent impedance represented by the coupling capacitors 222 and 224 as well as the signal choke block 214; and 3) the impedance between power line 208 and the neutral line 210 representing the load of the transformer 120. Similarly, 524 would be determined by the impedance observed looking into power-neutral line pair 236 and 210, the signal choke block 218, and impedance across power-neutral line pair 240 and 210 for application at the transmitter/receiver 202.

While this invention has been described in conjunction with specific embodiments thereof, it is evident that many alternatives, modifications and variations would be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A power line communications system, comprising:

a first power line and a second power line;

a neutral line;

a transmitter/receiver coupled to the neutral line and the first and the second power lines, the transmitter/receiver transmitting and receiving information using the first power line and the neutral line as a first channel and the second power line and the neutral line as a second channel, wherein the first channel is independent of the second channel.

2. The system of claim 1, wherein the transmitter/receiver comprises:

a first receiver coupled to the first power line and the neutral line, the first receiver generating a first output;

a second receiver coupled to the second power line and the neutral line, the second receiver generating a second output; and an equalizing device coupled to the first and the second receivers, the equalizing device receiving the first and the second outputs and generating a first channel output and a second channel output.

3. The system of claim 2, wherein the equalizing device comprises:

a first equalizer receiving the first output of the first receiver and generating a first equalizer output;

a second equalizer receiving the second output of the second receiver and generating a second equalizer output;

a first summer subtracting the second equalizer output from the first equalizer output to generate the first channel output;

a third equalizer receiving the first output of the first receiver and generating a third equalizer output;

a fourth equalizer receiving the second output of the second receiver and generating a fourth equalizer output; and a second summer subtracting the third equalizer output from the fourth equalizer output to generate the second channel output.

4. The system of claim 3, wherein each of the first, the second, the third and the fourth equalizers is selected from any one of an adaptive filter, a linear feedback equalizer, a decision feedback equalizer and an echo canceller.

5. The system of claim 2, wherein the equalizer device comprises:

a first equalizer receiving the second output of the second receiver and generating a first equalizer output;

a first summer subtracting the first equalizer output from the first output of the first receiver to generate a first summer output;

a second equalizer receiving the first summer output and generating the first channel output;

a third equalizer receiving the first output of the first receiver and generating a third equalizer output;

a second summer subtracting the third equalizer output from the second output of the second receiver to generate a second summer output; and a fourth equalizer receiving the second summer output and generating the second channel output.

6. The system of claim 5, wherein each of the first, the second, the third and the fourth equalizers is selected from any one of an adaptive filter, a linear feedback equalizer, a decision feedback equalizer and an echo canceller.

7. The system of claim 1, wherein the transmitter/receiver comprises:

a transmitter;

a receiver;

a hybrid circuit coupled to the transmitter, the receiver and one of the first and the second channels as a data channel, the hybrid circuit transmitting data to and receiving the data from the data channel.

8. The system of claim 7, wherein the hybrid circuit comprises:

a first resistor having a first terminal and a second terminal, the first terminal being connected to a first terminal of the hybrid circuit and the second terminal being connected to a fourth terminal of the hybrid circuit which is coupled to a power line of the data channel;

a second resistor having a first terminal and a second terminal, the first terminal of the hybrid circuit being connected to the first terminal of the hybrid circuit and the second terminal of the second resistor being connected to a third terminal of the hybrid circuit; and an impedance device connected between the third terminal of the hybrid circuit and a second terminal of the hybrid circuit which is a neutral line of the data channel, the impedance device having an impedance value substantially equal to a channel impedance of the data channel.

9. The system of claim 8, wherein the transmitter comprises a driver having a single input and two outputs, the driver driving the first and the second terminals of the hybrid circuit with the two outputs.

10. The system of claim 9, wherein the driver comprises:

a first buffer having a first positive input terminal, a first negative terminal and a first output terminal;

a second buffer having a second positive input terminal, a second negative terminal and a second output terminal;

a third resistor having a first terminal connected to the first output terminal of the first buffer, and a second terminal connected to the first negative input terminal of the first buffer;

a fourth resistor having a first terminal connected to the second output terminal of the second buffer, and a second terminal connected to the second negative input terminal of the second buffer; and a fifth resistor having a first terminal connected to the second terminal of the third resistor, and a second terminal connected the second terminal of the fourth resistor, the first output terminal of the first buffer being connected to the first terminal of the hybrid circuit and the second output terminal of the second buffer being connected to the second terminal of the hybrid circuit.

11. The system of claim 9, wherein the receiver comprises:

a differential receiver coupled to the third and the fourth terminals of the hybrid circuit;

a summer having a positive input connected to an output terminal of the differential receiver;

a receiver buffer having an input terminal connected to an output terminal of the summer; and an echo canceller connected between the single input of the driver and a negative input of the summer, the echo canceller being connected to the output terminal of the summer to receive a error signal for updating weights of the echo canceller.

12. The system of claim 11, wherein the echo canceller is an adaptive filter.

13. The system of claim 1, wherein the transmitter/receiver comprises:

a transmitter;

a receiver; and an echo canceller coupled to the transmitter and the receiver, wherein the echo canceller cancels signals transmitted by the transmitter from signals received by the receiver.

14. The system of claim 13, wherein the echo canceller is an adaptive filter.

15. The system of claim 1, further comprising a plurality of decoupling devices, a first portion of the decoupling devices being connected in-line to the first power line and a second portion of the decoupling devices being connected in-line to the second power line, the transmitter/receiver being coupled to the first and the second power lines between two of the decoupling devices.

16. The system of claim 1, wherein the transmitter/receiver is coupled to the first and the second power lines through capacitors.

17. The system of claim 1, wherein the first and the second channels are duplex channels.

18. A method for operating a power line communications system, comprising:

transmitting first information through a first power line and a neutral line;

transmitting second information through a second power line and the neutral line;

receiving third information through the first power line and the neutral line; and receiving fourth information through the second power line and the neutral line, wherein the first power line and the neutral line forms a first channel, and the second power line and the neutral line forms a second channel, the first channel being independent of the second channel.

19. The method of claim 18, further comprising:

generating a first output from the first channel;

generating a second output from the second channel; and equalizing the first and the second outputs to generate a first channel output and a second channel output.

20. The method of claim 19, wherein the equalizing step comprises:

equalizing the first output to generate a first equalized output;

equalizing the second output to generate a second equalized output;

subtracting the second equalized output from the first equalized to generate the first channel output;

equalizing the first output to generate a third equalized output;

equalizing the second output to generate a fourth equalized output; and subtracting the third equalized output from the fourth equalized to generate the second channel output.

21. The method of claim 20, wherein each of the first, the second, the third and the fourth equalized outputs is generated by any one of an adaptive filter, a linear feedback equalizer, a decision feedback equalizer and an echo canceller.

22. The method of claim 19, wherein the equalizing step comprises:

equalizing the second output to generate a first equalized output;

subtracting the first equalized output from the first output to generate a first summer output;

equalizing the first summer output to generate the first channel output;

equalizing the first output to generate a third equalized output;

subtracting the third equalized output from the second output to generate a second summer output; and equalizing the second summer output to generate the second channel output.

23. The method of claim 22, wherein each of the first, the second, the third and the fourth equalized outputs is generated by any one of an adaptive filter, a linear feedback equalizer, a decision feedback equalizer and an echo canceller.

24. The method of claim 18, wherein the first and third information are transmitted and received over the first channel through a first hybrid circuit, and the second and fourth information are transmitted and received over the second channel through a second hybrid circuit.

25. The method of claim 18, further comprising:

echo cancelling the first information from the third information; and echo cancelling the second information from the fourth information.

26. The method of claim 18, further comprising decoupling the first and second power lines by placing decoupling devices in-line to the first and the second power lines, wherein the first and the second information are transmitted and the third and fourth information are received from the first and the second power lines between the decoupling devices.

* * * * *